Aug. 28, 1945.        R. M. ISHAM        2,383,551
SEPARATION OF ACETYLENE FROM GASEOUS MIXTURES
Filed Oct. 21, 1941        3 Sheets-Sheet 1

Inventor
Robert M. Isham
By Raymond J. Norton
Attorney

Patented Aug. 28, 1945

2,383,551

UNITED STATES PATENT OFFICE 2,383,551

SEPARATION OF ACETYLENE FROM GASEOUS MIXTURES

Robert M. Isham, Okmulgee, Okla., assignor to Danciger Oil & Refineries, Inc., Fort Worth, Tex., a corporation of Texas Application October 21, 1941, Serial No. 415,975

15 Claims. (Cl. 62—175.5)

This invention relates to the separation of acetylene from gaseous mixtures produced by the thermal treatment of hydrocarbons and to the concentration and purification of the separated acetylene.

It is known that acetylene may be produced from hydrocarbons of the methane and ethylene series by such methods as; controlled pyrolysis of hydrocarbons; passage through an electric arc, incomplete combustion and the like. In all such methods the reaction product is comprised only in part of acetylene, that is to say, the acetylene is accompanied by large volumes of other gases; depending upon the thermal treatment used, these may be hydrogen, methane, nitrogen, carbon monoxide, carbon dioxide together with a considerable proportion of ethylene. These reaction gas mixtures also contain vapors of benzene, naphthalene and other aromatic hydrocarbons, formed probably by the partial polymerization of the initially formed acetylene. The gas mixture also contains considerable amounts of carbon black.

The separation of the several constituents of this reaction product constitutes a real problem and has engaged the attention of workers in this art. Several methods of operation have been proposed in the past.

In one, the gas mixture is subjected to a series of low temperature rectification steps in the latter stages of which liquefied ethylene is used as a reflux.

In another type of operation the crude gas mixture is scrubbed with straw oil to remove benzol and other aromatic constituents, the resulting gas is then carefully treated to remove $CO_2$ (by means of a solvent) and the carbon dioxide-free resulting gas is treated in sequential selective absorption stages to preferentially abstract first the acetylene and then the ethylene.

In another method it has been proposed to first remove the aromatic hydrocarbons and then concentrate the acetylene in the gas mixture by scrubbing the mixture under pressure with a solvent which has a preferential affinity for the acetylene. A number of selective solvents have been proposed for this purpose including water, esters of polybasic acids, esters of polyacid alcohols, polyketones, ethyl carbonate, lactones and the like. A particularly effective method of solvent concentration of this type is described in prior Patent 2,063,680.

This product, though enriched in acetylene, contains appreciable amounts of other gases present in the original gas mixture and notably ethylene. For many purposes it is necessary to free this enriched gas from contained ethylene, as, for example, when the acetylene is to be converted into acetaldehyde by hydration in the presence of a mercury catalyst, because ethylene rapidly destroys the activity of the catalyst solution. As a result of extensive experimentation in this field an improved method of separating acetylene and ethylene from gaseous mixtures containing them has been developed. The new method is of broad application to gas mixtures containing these two components but as will be appreciated it is preferred to operate upon mixtures in which these two components are relatively highly concentrated. Hence, as will be seen more fully hereinafter, the improved method of fractionating acetylene and ethylene is correlated with an improved process of concentrating these constituents as they occur in certain reaction gases such as is produced by the general methods described above, e. g. by partial combustion of hydrocarbons of the methane and ethylene series, passage of these gases through an electric arc and the like.

Specifically it has been ascertained that the separation of acetylene from ethylene, together with hydrogen, carbon monoxide and other light gases may most advantageously be accomplished by insuring a predetermined amount of carbon dioxide in the gaseous mixture, partially liquefying the gas and fractionating in the presence of the carbon dioxide. The carbon dioxide may be introduced into the gas which is to be fractionated prior to liquefaction or it may be introduced as a refluxing medium during the fractionating step, or both. As will be appreciated certain gases which are treated according to the invention may normally contain sufficient carbon dioxide to secure the beneficial results herein contemplated. In such event the conditions of the preliminary concentration steps should be controlled so as to retain such carbon dioxide, or a substantial proportion of it, in the concentrated gas mixture which is to be fractionated.

The establishment of a predetermined amount of carbon dioxide in a gas mixture containing acetylene and ethylene has a positive, beneficial effect in fractionation. The vapor pressure curve of carbon dioxide lies approximately midway between the vapor pressure curves of acetylene and ethylene at all points between the freezing point of carbon dioxide and the critical point of ethylene. In such circumstances, even with a low reflux ratio, it is possible to fractionate a mixture containing ethylene and acetylene so as to withdraw a gaseous product from the top of a fractionating column which contains all of the ethylene, and a portion of the carbon dioxide, (together with light gases) free from acetylene and concurrently to withdraw a liquid fraction from the base of the column containing all of the acetylene together with some carbon dioxide, free from ethylene. In the preferred operation, if the crude gases to be treated are deficient in carbon dioxide, the carbon dioxide is introduced at some point prior to compression of the gas mixture. This presents two positive advantages; first, it insures the liquefaction of acetylene at a much lower partial pressure of the latter than in the absence of carbon dioxide and secondly it precludes all danger of spontaneous explosion of the acetylene during compression.

The product recovered in the described fractionation of enriched gas mixtures comprises a gas fraction containing ethylene, carbon dioxide and certain light gases and a second liquid fraction comprising acetylene and carbon dioxide. For certain purposes these fractions may be used without further purification. In the event it is desired to remove the carbon dioxide from these fractions this may readily be accomplished by contacting each fraction with a selective solvent for the carbon dioxide such as an aqueous solution of an alkali carbonate, triethanolamine or other equivalent solvents.

It will be appreciated that the above described principles may be embodied in a number of specifically different methods. To exemplify and to more fully describe the fundamental principles of the invention a preferred method of operation will be described.

In the drawings

Figure 1:
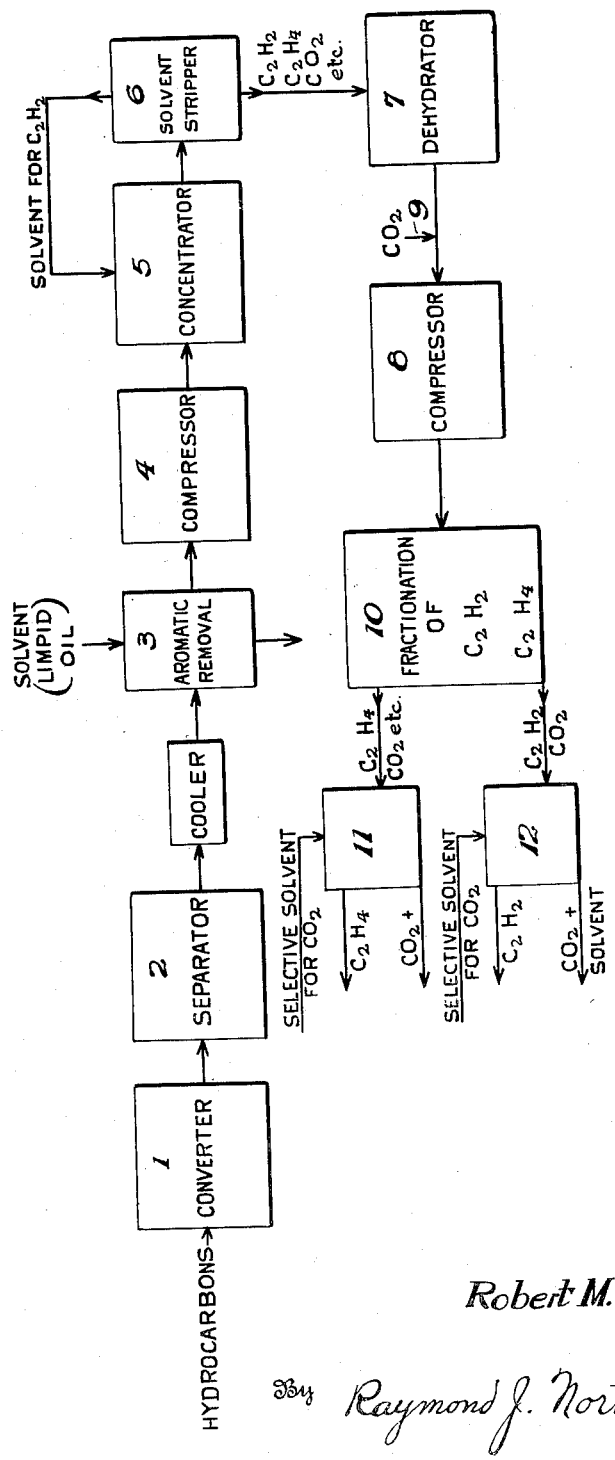
Fig. 1 is a flow sheet showing the main steps of the process in their sequential relationship.

As shown in Fig. 1 the hydrocarbon gases or vapors are first treated in a converter 1 so as to insure the production of acetylene. As mentioned previously, this conversion may be effected in an electric arc furnace, a partial combustion apparatus, or any other suitable apparatus. The gas mixture produced in the converter is passed to the separator 2 in which the carbon black is separated from the reaction gases. This may be a Cottrell precipitator, a filter or any other suitable device which functions to separate the solid material suspended in the gas.

The gas mixture which is thus freed of solid impurities is then subjected to a solvent fractionation to remove the contained aromatic constituents. In the preferred operation this is achieved by scrubbing the gases with a high boiling aromatic oil. An excellent solvent for this purpose is "limpid oil," i. e., a mixture of coal tar hydrocarbons boiling between 220° and 264° C. It is found that this oil very effectively extracts the vapors of the aromatic hydrocarbons, such as benzene and naphthalene and is more effective for this purpose than gas oil which has been proposed heretofore.

The gas which is stripped of the volatile hydrocarbons, in the manner more fully to be described, is then passed to a compression stage 4 where it is highly compressed so as to facilitate concentration and is then passed to the concentrator 5. In the concentrator 5 the compressed gas is contacted with a solvent which has a preferential affinity for the acetylene. For this step a number of selective solvents may be used, such as those previously mentioned. A particularly effective solvent for this purpose is butyrolactone. With such an operation a gas containing 4.4% by volume of acetylene may be concentrated to produce a gas mixture containing 58.4% of acetylene. The solvent containing the acetylene (together with a proportion of other gases, such as ethylene, carbon dioxide etc.) is then treated in the stripping apparatus 6 where the gases are evolved from the solvent and the latter returned for further use in the concentrating zone 5.

The stripped gas, enriched in acetylene and ethylene, is dehydrated in any suitable dehydrating unit 7 and is then treated to separate it into acetylene and ethylene fractions. In accordance with a fundamental feature of the invention this is done by partial liquefaction and subsequent fractionation in the presence of carbon dioxide. As shown in Fig. 1 the gas is passed to the compression stage 8, described more fully hereinafter, in which it is partially liquefied. If the gas mixture does not contain sufficient $CO_2$ the requisite quantity is fed in through line 9.

The refrigerated partially liquefied mixture is then fed to the fractionating stage 10 and the conditions therein are so controlled as to take off an overhead gas fraction containing essentially ethylene, carbon dioxide and the lighter constituents of the enriched gas ($H_2$, $N_2$, CO, $CH_4$) and a bottom liquid fraction comprised essentially of acetylene and carbon dioxide.

These fractions may be withdrawn and used directly if desired or they each may be treated to remove the associated carbon dioxide. For this purpose the ethylene-rich fraction may be passed to the scrubber 11 and the acetylene-rich fraction to the scrubber 12. In the scrubbers the respective fractions are suitably contacted with a selective solvent for the carbon dioxide which acts to extract the carbon dioxide from the associated acetylene or ethylene.

It will be observed that the complete process comprehends not only the novel concept of fractionating mixtures of acetylene and ethylene by partial liquefaction followed by fractionating in the presence of carbon dioxide, but also the effective correlation of this step with certain preliminary steps which insure an efficient concentration of the acetylene from gaseous mixtures containing it. For example, the preferred selective solvents used in stage 5 for concentrating acetylene also function most advantageously in the process because they are also solvents for carbon dioxide. They serve thus to insure the retention of the carbon dioxide which is normally present in the crude gases and make it available for positive advantageous use in the subsequent fractionation. For example, butyrolactone which, as already described, is an excellent solvent for acetylene, is similarly an effective solvent for carbon dioxide; at 33° C. one volume of butyrolactone dissolves 4.20 volumes of carbon dioxide. Triacetin and acetonyl acetone which are good selective solvents for acetylene dissolve 4.36 and 4.0 volumes of carbon dioxide respectively.

Figure 2:
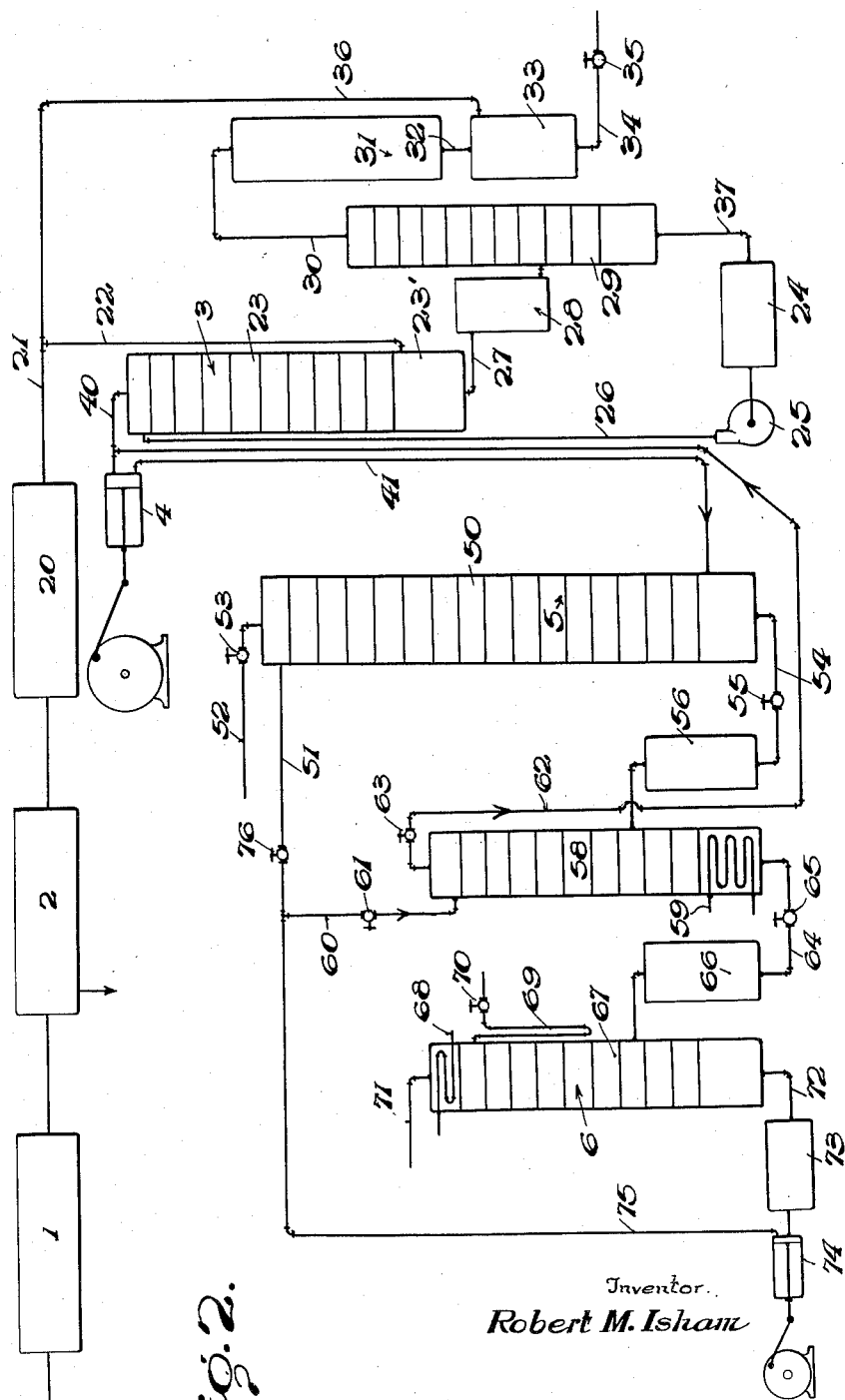
Fig. 2 is a side elevation of an apparatus, in diagrammatic form, suitable for the production of acetylene-containing gas mixtures and means for partially purifying and concentrating the gas.
Figure 3:
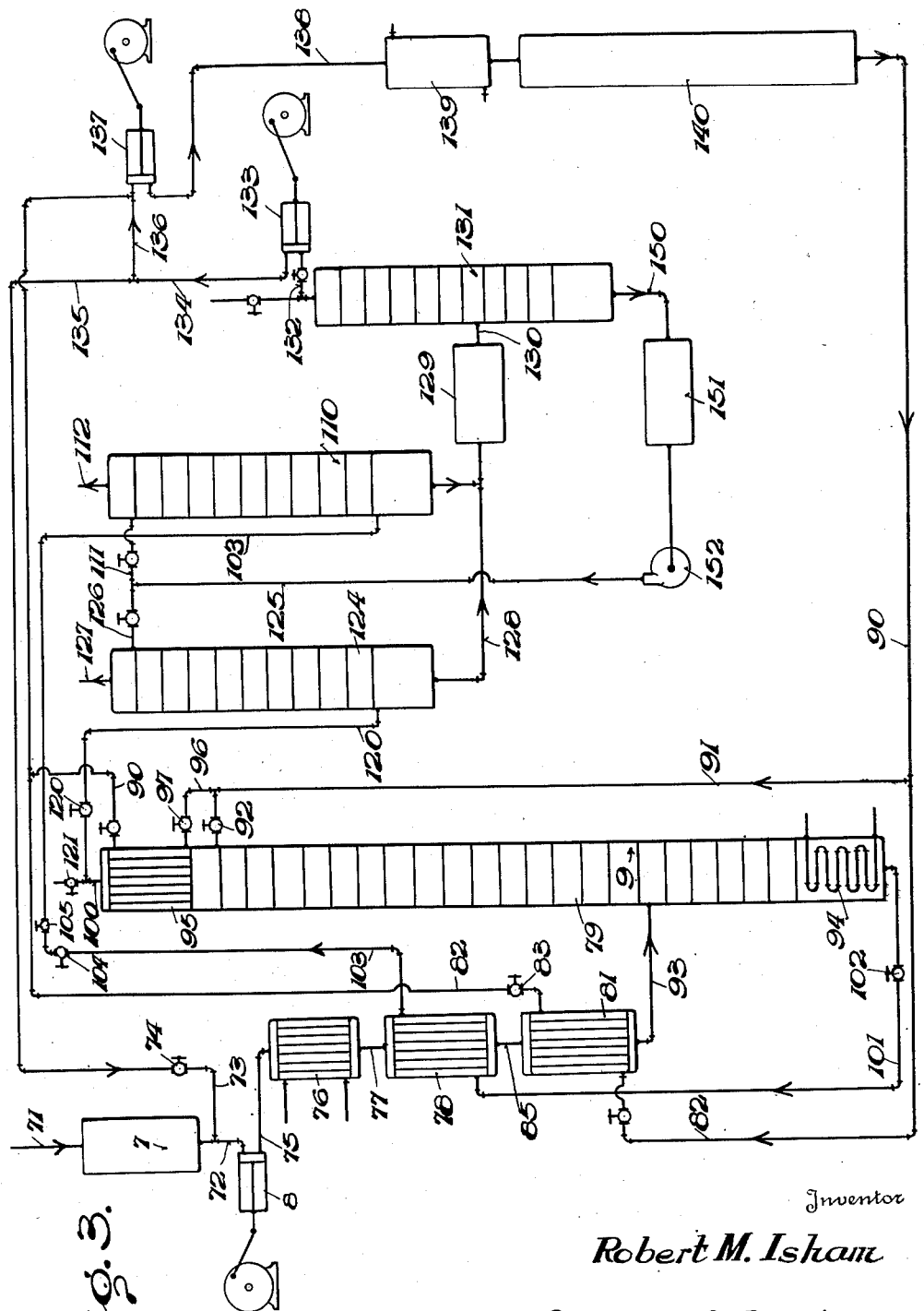
Fig. 3 is a diagrammatic side elevation of an apparatus for fractionating the acetylene-enriched gas.

A fuller appreciation of the efficacy of the improved process will be derived from a consideration of the full details of the general steps shown in Fig. 1, as is amplified in the manner shown in Figs. 2 and 3.

As there shown, the entering hydrocarbon gases are fed into the convertor 1 and pass sequentially through the carbon black-removing unit 2, the cooler 20 where the temperature is reduced to substantially atmospheric temperature. The temperature reduction may be secured in any advantageous manner by direct or indirect contact with a cooling medium.

The cooled gas is then passed by way of lines 21 and 22, to a scrubbing tower 23 in which the gases are treated so as to remove volatile hydrocarbons such as benzene, naphthalene and the like. As shown, the gases enter the column 23 at a lower section thereof. As the gases pass upwardly through the tower they are scrubbed by a countercurrent, downwardly flowing, stream of "limpid oil." This scrubbing oil is drawn from the container 24 and is forced by pump 25 through line 26 to the top plate of the column. As the oil flows downwardly through the tower it becomes saturated with the vapors of the volatile hydrocarbons. The saturated oil accumulating in the base 23' flows through line 27 to a recovery unit. The line 27 discharges into a heater 28 in which its temperature is raised well above its initial boiling point. The heated oil is then discharged to the fractionating column 29. The vapors of volatile material, together with any gas which was dissolved by the oil pass upwardly through column 29 and are discharged through line 30 to condenser 31. The condensate formed in condenser 31 together with uncondensed gases flows through line 32 to the separator 33. This condensate is withdrawn from the system through line 34 and valve 35. The uncondensable gases separated in separator 33 pass through line 36 and are recycled through the scrubbing tower 23.

The wash oil which accumulates in the base of column 29 and which is freed of volatile hydrocarbons flows through line 37 to container 24 in which it is cooled prior to recycling back to column 23.

The units 23 to 37 inclusive, thus comprise essentially a single stage in the operation, the function of which is to free the crude gaseous mixture of its contained aromatic components by means of a selective solvent extraction treatment in which the selective solvent is continuously denuded of its extracted components and continuously recycled through the stripping apparatus.

The gas mixture which in column 23 was stripped of the vapors of volatile hydrocarbons is passed through line 40 to the compressor 4 where it is highly compressed. It is then passed through the line 41 to the acetylene concentration unit 5. This unit consists essentially of the column 50 in which a selective solvent for acetylene is used to scrub the incoming gases. As shown, the gases enter the column at the base and are contacted by a countercurrent downwardly flowing stream of solvent admitted through line 51. The selective solvents employed, which may be any of those previously mentioned, also absorb ethylene to a lesser extent and also, as pointed out, absorb carbon dioxide if the latter is present. There is of course, some absorption of the other constituents of the entering gas in proportion to the partial pressure of each constituent of the gas and its solubility, in the particular solvent employed. By properly controlling the pressure in the tower and the proportion of solvent which is circulated, the entering gaseous mixture may be substantially completely stripped of its contained acetylene. The residual gas is discharged from the tower through the line 52 and valve 53. This gas may be recycled through the thermal conversion stage 2 or discharged from the system.

The selective solvent flowing downwardly in the tower becomes saturated with the constituents of the gas, as explained in proportion to the respective partial pressures and solubility of these constituents in the solvent. The saturated solvent accumulating in the base of the tower is passed through the line 54, controlled by valve 55 to a reboiler unit. As shown, the saturated solvent is discharged to the preheater 56 and line 57 to the reboiler 58. The reboiler 58 is provided with the heating coil 59 situated in the base of the tower. In operation the pressure and temperature conditions in the tower 58 are carefully controlled so as to evolve lighter gases such as hydrogen, nitrogen, carbon monoxide and methane from the solvent with but little evolution of acetylene and ethylene. These evolved gases pass upwardly through the tower and are scrubbed by a secondary stream of cooled selective solvent admitted through line 60 and valve 61. The gases relatively poor in acetylene and ethylene pass out of the tower through line 62 controlled by valve 63. Such stripped gas then passes through this line to the suction side of compressor 4 for recompression and recycling through the absorption tower 50.

The selective solvent accumulating in the base of tower 58 passes through the line 64 and pressure reduction valve 65 to heater 66 and thence to the stripping column 67. Due to the reduction in pressure and elevation of temperature the gases dissolved in the solvent are evolved and pass upwardly through the tower. By proper control of the heat and pressure conditions substantially all the dissolved gases are expelled from the solvent. During this operation any water that may have been absorbed by the solvent in its passage through the absorption tower is also distilled from the solvent and passes upwardly in tower 67 together with the gases. The upper part of tower 67 is provided with the cooling coil 68 which serves to condense vaporized water which condensate is withdrawn from the tower through condensate line 69 controlled by valve 70.

The enriched gas which is freed from the solvent as well as water passes out of the top of the tower through line 71 and is subjected to partial liquefaction and fractionation in the presence of carbon dioxide in a manner more fully to be described. The denuded solvent accumulating in the base of tower 67 passes through line 72 to the cooler 73 in which it is reduced to substantially atmospheric temperature. This cooled solvent is picked up by pump 74 and forced through line 75 and valve 76 to the upper section of the absorption tower 50. Branch 61, as shown, is tapped into line 75 to supply the secondary stream of solvent to reboiler column 58.

In this phase of the operation, as will be observed, a cyclic stream of solvent is employed to contact the acetylene-containing gas to increase the acetylene content while simultaneously removing contained water as well as a certain proportion of undesired gas fractions.

It will be observed that in this operation the carbon dioxide content of the original gas undergoing treatment is retained in the enriched gas mixture and it thus becomes available for its beneficial functions in the subsequent fractionation step. It will be appreciated that the particular apparatus outlined above is merely indicative of other specific structures which function similarly and serve to effect the several major phases or steps in the operation indicated diagrammatically in Fig. 1 after stages 1 to 6 inclusive.

As shown in Fig. 3, the gas fraction recovered from the top of tower 67 which is enriched in acetylene and ethylene is then submitted to a special fractionation to recover the acetylene free from ethylene and other light gases. For this purpose the enriched gas is passed through line 71 to the dehydrator 7 in which the gases are contacted with any suitable dehydrating agent.

The dehydrated, enriched gas is then passed by way of line 72 to the compressor 8. If the gases to be compressed are deficient in carbon dioxide this deficiency may be made up by introducing carbon dioxide to the suction side of the compressor through line 73 and valve 74.

In the compressor 8 the entering gases are compressed to the extent necessary to achieve the desired partial liquefaction under subsequent refrigeration and then flow through line 75 to the water-cooled condenser 76. From the condenser 76 the cooled material passes through line 77 to the heat exchanger 78 in which it is subjected to indirect heat exchange with the cool liquid fraction withdrawn from the bottom of the fractionating column 79. The compressed cooled gas then flows through line 80 to the final cooler 81, in which it is further refrigerated by indirect contact with liquid carbon dioxide passing through line 82 and evaporated against a controlled back pressure by means of valve 83.

In the compression and cooling or refrigeration stages the enriched gas is partially liquefied in the presence of carbon dioxide which, as noted, precludes any possibility of an explosion of acetylene. It will be noted that in lieu of or in conjunction with the final refrigeration step effected in cooler 81 refrigeration of the gases may be effected by introducing liquid carbon dioxide from line 90 and branch 91 under control of valve 92 to the top plate of the fractionating column 79.

The refrigerated mixture, as shown, is withdrawn from the final cooler 81 and passed by way of line 93 to an intermediate tray of the fractionating column 79. The column 79, as shown, is provided with a heating coil 94 situated in the base, and with the dephlegmator 95 located at the upper portion of the column. The temperature in the dephlegmator is regulated by the evaporation of liquid carbon dioxide entering through branch line 96 and valve 97 against a properly controlled back pressure.

It will be observed that by establishing a suitable temperature gradient in the tower 79 and maintaining a suitable reflux ratio the acetylene contained in the upwardly flowing gases, together with some carbon dioxide, is accumulated as a liquid in the bottom section, while the ethylene, together with all light gases including hydrogen, nitrogen, carbon monoxide and methane, as well as a portion of the carbon dioxide, pass out of the top of the column through line 100.

These two fractions thus withdrawn may be employed as such or, in the preferred operation, may be further purified.

For further purification the liquid acetylene-carbon dioxide fraction is withdrawn from the base of the tower, either continuously or intermittently, and is passed through line 101, controlled by valve 102, to serve as a cooling medium in the heat exchanger 78, in which it gives up a portion of its heat to the compressed, enriched gases in transit to tower 79. By reason of this heat exchange the bottom liquid fraction is warmed and the evaporated product passes outwardly of the heat exchanger 78 through the line 103. The line 103, is provided with valves 104 and 105, which are regulated to maintain a sufficient back pressure on the liquid so as to preclude undue reduction of its temperature to thus avoid separation of solid carbon dioxide or acetylene. The evaporated gaseous mixture of acetylene and carbon dioxide passes to the base of a rectifying column 110 in which the acetylene is separated from the carbon dioxide. This is effected by contacting the mixture with a solvent which has a preferential affinity for the carbon dioxide. This solvent is introduced to the top of the tower through line 111 and passes countercurrently to the upwardly flowing gases. As a result of this treatment a stream of purified acetylene gas is withdrawn overhead through the line 112. The selective solvent, with its contained carbon dioxide, which accumulates in the base of tower 110, is passed to the heater 129.

Contemporaneously, if desired, the gaseous ethylene-containing fraction separated in the tower 79 is passed by way of line 120 controlled by valves 121 and 122 to a scrubbing tower 124 similar in structure and function to tower 110. In this tower the upwardly flowing gaseous stream is contacted by a counter-currently flowing stream of a selective solvent, as, for example, triethanolamine, admitted to the top of the tower through line 125 and the valve controlled branch 126. In the tower the selective solvent absorbs the carbon dioxide and a gaseous stream of ethylene together with associated light gases, passes outwardly of the tower through the top line 127. The selective solvent containing absorbed carbon dioxide accumulating in each of the towers 110 and 124 is drawn off through line 128 to the heater 129. In this element the solvent is heated and then passed by way of line 130 to the stripping tower 131. In the stripping tower carbon dioxide is evolved and passes overhead through line 132. The gas is compressed in the compressor 133 and passed by way of line 134 either to the branch 135 or 136. The carbon dioxide passing through line 135 as shown is utilized as make-up for the purified gases passing to the compression stage 8. Any portion of the carbon dioxide passing through line 134 may be passed through line 136 to the high stage compressor 137. Compressed carbon dioxide from this compression stage passes by way of line 138 to condenser 139 and thence to the liquid carbon dioxide accumulator 140. Liquid carbon dioxide from this accumulator, as previously explained, is utilized as a reflux liquid in the tower 79 and as a cooling medium in the dephlegmator 95 and the final cooler 81.

The denuded selective solvent for the carbon dioxide which accumulates in the base of the tower 131 is passed through line 150 to a cooler 151 and is picked up by pump 152 and forced to the upper portions of the absorption towers 110 and 124, as previously described.

It will be appreciated that operative conditions of temperature and pressure which are maintained in the fractionating stage 9 (tower 79) are to be correlated with each other and with the composition of the enriched gas undergoing fractionation. The temperature in the system should be maintained above the freezing point of carbon dioxide (−56.6° C.). It is to be remembered however that the presence of acetylene and ethylene depresses this freezing point somewhat so that the stated temperature is not necessarily the lowest possible temperature that may be used. Hence if some refrigerant other than carbon dioxide is employed, as for example in the final cooler 81 or dephlegmator 95 a somewhat lower temperature may be utilized. Conversely the maximum temperature employable in the tower is the critical temperature of carbon dioxide, namely 31.1° C. As those skilled in the art will apprehend, between these temperature limits for any given gas composition and dephlegmator temperature a pressure should be chosen at which the carbon dioxide in the dephlegmator will be partially condensed, to produce reflux, but not wholly condensed. Similarly the temperature in the base of fractionator 9 must be controlled above the boiling point of pure carbon dioxide but below the boiling point of acetylene at the particular pressure obtaining in the tower.

Based on operative temperature which is chosen and the composition of the entering gas mixtures the pressure may vary from approximately two to 100 atmospheres. In ordinary circumstances when an enriched gas mixture is employed the pressures employed need not exceed about 15 atmospheres.

The process above described has been operated with notable success. In a typical operation a gas was produced in a converter 1 which contained 2.01% acetylene, 0.78% ethylene and 3.95% carbon dioxide. This gas was treated in unit 2 to remove carbon black, was cooled and treated in unit 3 to remove the vapor of light hydrocarbons. The gas was then passed to compressor 4 and compressed to 250 lbs. and scrubbed in unit 5 with butyrolactone. The unabsorbed or residual gas was vented from the system.

The butyrolactone solution was reboiled in unit 6 at a temperature of 93° C. and under a pressure of 30 lbs. to remove the major part of the light gases (line 62). The solution, now enriched in acetylene, was stripped of the latter by heating the solution to 107° C. at atmospheric pressure. The overhead product analyzed 40.6% acetylene, 8.8% ethylene, 43.5% carbon dioxide and 7.1% light gases ($H_2$, N, CO, $CH_4$).

This enriched gas was passed to the dehydrating stage 7 and dehydrated over activated alumina. The dehydrated gas was then passed to the compression stage 8 and compressed to 125 lbs. gauge and cooled to −40° C. by evaporating carbon dioxide in the final cooler (81), against a back pressure of 117 gauge. Due to the high content of $CO_2$ which had been retained in the enriched gas it was unnecessary to add any of it in the compression stage.

The partially liquefied enriched gas was passed to fractionator 9. The temperature at the bottom of the column was maintained at −37° C. and the temperature of the top at −45° C. by evaporating liquid carbon dioxide in the dephlegmator against a back pressure of 105 lbs. gauge. During this operation a reflux ratio of approximately 5 to 1 was maintained.

The acetylene fraction withdrawn from the bottom of the fractionating column was evaporated in the heat exchanger (78) and was found to comprise 67% acetylene and 33 percent carbon dioxide. During this evaporation a back pressure of 45 lbs. gauge was maintained in the shell of the heat exchanger. An analysis of the gas withdrawn from the top of the fractionator 9 showed it to contain by volume percent 55.5% of carbon dioxide, 22.3% of ethylene and 18.2% of light gases.

The evaporated acetylene-carbon dioxide mixture was treated in unit 11 to remove the carbon dioxide and the resulting acetylene was of higher than 99% purity. Similarly, the ethylene fraction was treated in unit 10 to remove the carbon dioxide, after which it was found to contain 54.9% ethylene and 45.1% of light gases.

It will thus be observed that the described process is particularly effective. As disclosed, it presents an improved method of producing substantially pure acetylene from lean gases by an effective, economical and safe procedure. Similarly, the novel method provides an efficient process for fractionating gases containing ethylene and acetylene to separate these two components. The method of concentrating the acetylene from lean gases is of independent utility but is of increased value when correlated with the novel fractionating procedure in the manner described.

While a preferred embodiment of the invention has been described, it is to be understood that this is given to exemplify the fundamental principles of the new concepts and not as limiting the useful scope of the invention and the particular sequence of operations described.

I claim:

1. A method of separating acetylene from ethylene from a gas mixture containing them which comprises partially liquefying the gas in the presence of added carbon dioxide, fractionating the partially liquefied gas to recover an overhead gaseous fraction containing the ethylene and carbon dioxide and a liquid fraction containing the acetylene and carbon dioxide.

2. A method of producing acetylene of high concentration from lean gases containing acetylene and ethylene which comprises, compressing the gas, contacting the gas with a selective solvent for acetylene and ethylene, treating the solvent to recover a gas enriched in acetylene and ethylene, and fractionating the gas in the presence of a refluxing medium comprising carbon dioxide.

3. In the separation of acetylene and ethylene from gaseous mixtures thereof by fractional distillation that improvement which comprises fractionally distilling the mixture in the presence of carbon dioxide as a refluxing medium, and controlling the temperature and pressure conditions in the distillation to recover an overhead gaseous fraction containing the ethylene and carbon dioxide and a bottom liquid fraction containing the acetylene and carbon dioxide.

4. In the separation of acetylene and ethylene from gaseous mixtures thereof by fractional distillation under pressure in a distillation zone that improvement which comprises effecting such distillation in the presence of carbon dioxide as a refluxing medium, establishing a temperature gradient in the distillation zone to effect a condensation of acetylene, withdrawing a liquid fraction containing acetylene and carbon dioxide from one section of the zone and a gas fraction containing ethylene and carbon dioxide from another section of the zone.

5. A process in accordance with claim 4, in which each fraction is further treated to remove the contained carbon dioxide.

6. In the separation of acetylene and ethylene from gaseous mixtures thereof the improvement which comprises establishing a predetermined amount of carbon dioxide in the mixture, compressing and cooling the mixture to effect partial liquefaction thereof, fractionally distilling the mixture in a pressure distillation zone, controlling the temperature and pressure conditions within the zone to separate a liquid fraction containing acetylene and carbon dioxide and a gas fraction containing ethylene and carbon dioxide.

7. In the separation of acetylene and ethylene from gaseous mixtures thereof the improvement which comprises establishing a predetermined amount of carbon dioxide in the mixture, compressing and cooling the mixture to effect partial liquefaction of the gas, fractionally distilling the mixture in a pressure distillation zone, controlling the temperature and pressure conditions within the zone to separate a liquid fraction containing acetylene and carbon dioxide and a gas fraction containing ethylene and carbon dioxide, separating the carbon dioxide from at least one of the said fractions, liquefying the separated carbon dioxide and recycling it to the distillation zone for a refluxing medium therein.

8. A process for separating acetylene and ethylene from gaseous mixtures thereof which comprises concentrating the acetylene content of the gas by contacting the gas with a selective solvent for acetylene and ethylene, separating acetylene and other dissolved gases from the solvent, condensing and partially liquefying the concentrated gas and fractionally distilling the gas in a pressure distillation zone in the presence of a reflux liquid containing carbon dioxide.

9. In the separation of acetylene and ethylene from gaseous mixtures thereof, the improvement which comprises establishing a predetermined amount of carbon dioxide in the mixture, compressing and cooling the mixture to effect partial liquefaction, distilling the mixture in a pressure distillation zone in the presence of a reflux liquid containing carbon dioxide, recovering a liquid fraction containing acetylene and carbon dioxide and a gaseous fraction containing ethylene and carbon dioxide and separating the carbon dioxide from each fraction.

10. In the separation of acetylene and ethylene from gaseous mixtures thereof, the improvement which comprises establishing a predetermined amount of carbon dioxide in the mixture, compressing and cooling the mixture to effect partial liquefaction, distilling the mixture in a distilling zone in the presence of a reflux liquid containing carbon dioxide, recovering a liquid fraction containing acetylene and carbon dioxide and a gaseous fraction containing ethylene and carbon dioxide, separating the carbon dioxide from each fraction, liquefying at least a portion of the carbon dioxide and utilizing the liquefied separated carbon dioxide to cool the said compressed mixture.

11. A process of separating acetylene and ethylene from gaseous mixtures thereof, which comprises contacting the mixture with "limpid oil" to extract volatile hydrocarbons therefrom, compressing the residual gas and contacting it with a selective solvent for acetylene and ethylene, separating the solvent from unabsorbed gases, evolving the absorbed gases from the solvent, partially liquefying the evolved gases and fractionally distilling the gases in the presence of a refluxing medium containing carbon dioxide.

12. A process of separating acetylene and ethylene from gaseous mixtures thereof, which comprises contacting the mixture with "limpid oil" to extract volatile hydrocarbons therefrom, compressing the residual gas and contacting it with a selective solvent for acetylene and ethylene, separating the solvent from unabsorbed gases, evolving the absorbed gases from the solvent, partially liquefying the evolved gases and fractionally distilling the gases in the presence of a refluxing medium containing carbon dioxide and recovering a liquid fraction containing acetylene and carbon dioxide and a gaseous fraction containing ethylene and carbon dioxide.

13. A process of separating acetylene and ethylene from gaseous mixture thereof, which comprises contacting the mixture with "limpid oil" to extract volatile hydrocarbons therefrom, compressing the residual gas and contacting it with a selective solvent for acetylene and ethylene, separating the solvent from unabsorbed gases, evolving the absorbed gases from the solvent, partially liquefying the evolved gases and fractionally distilling the gases in the presence of a refluxing medium containing carbon dioxide, recovering a liquid fraction containing acetylene and carbon dioxide and a gaseous fraction containing ethylene and carbon dioxide and separating the carbon dioxide from each fraction.

14. A process in accordance with claim 13 in which the separated carbon dioxide is recycled for use as the refluxing medium.

15. A process in accordance with claim 13 in which the carbon dioxide is liquified and utilized to cool the compressed gas.

ROBERT M. ISHAM.